United States Patent
Shen

(10) Patent No.: US 7,236,432 B2
(45) Date of Patent: Jun. 26, 2007

(54) APPARATUS FOR READING A DATA STORAGE MEDIUM

(76) Inventor: Yu-Nung Shen, 4F, No. 52, Sec. 2, Chung-Shan N. Rd., Taipei City (TW)

(*) Notice: Subject to any disclaimer, the term of this patent is extended or adjusted under 35 U.S.C. 154(b) by 672 days.

(21) Appl. No.: 10/721,733

(22) Filed: Nov. 25, 2003

(65) Prior Publication Data

US 2004/0208089 A1  Oct. 21, 2004

(30) Foreign Application Priority Data

Dec. 2, 2002 (TW) .............................. 91219457 A

(51) Int. Cl.
*G11B 21/08* (2006.01)

(52) U.S. Cl. ............................... 369/39.01; 369/41.01; 369/277

(58) Field of Classification Search ............. 369/39.01, 369/41.01, 277, 276–280, 275.1, 272, 30.32, 369/44.14, 44.11; 235/462.25, 462.26, 462.28
See application file for complete search history.

(56) References Cited

U.S. PATENT DOCUMENTS 6,176,429 B1 * 1/2001 Reddersen et al. .... 235/462.25
6,505,778 B1 * 1/2003 Reddersen et al. .... 235/462.25

* cited by examiner

Primary Examiner—Ali Neyzari
(74) Attorney, Agent, or Firm—Ladas & Parry LLP

(57) ABSTRACT

In an apparatus for reading a data storage medium, a control unit controls a first driving unit so as to enable the first driving unit to drive a carrier frame loaded with the data storage medium thereon to move back and forth between first and second limit positions along a first direction, receives optically detectable information read by an optical detecting unit from the data storage medium, and activates a second driving unit to move the optical detecting unit by a predetermined distance along a second direction transverse to the first direction upon detection that the carrier frame has been moved by the first driving unit from one of the first and second limit positions to the other one of the first and second limit positions.

32 Claims, 9 Drawing Sheets

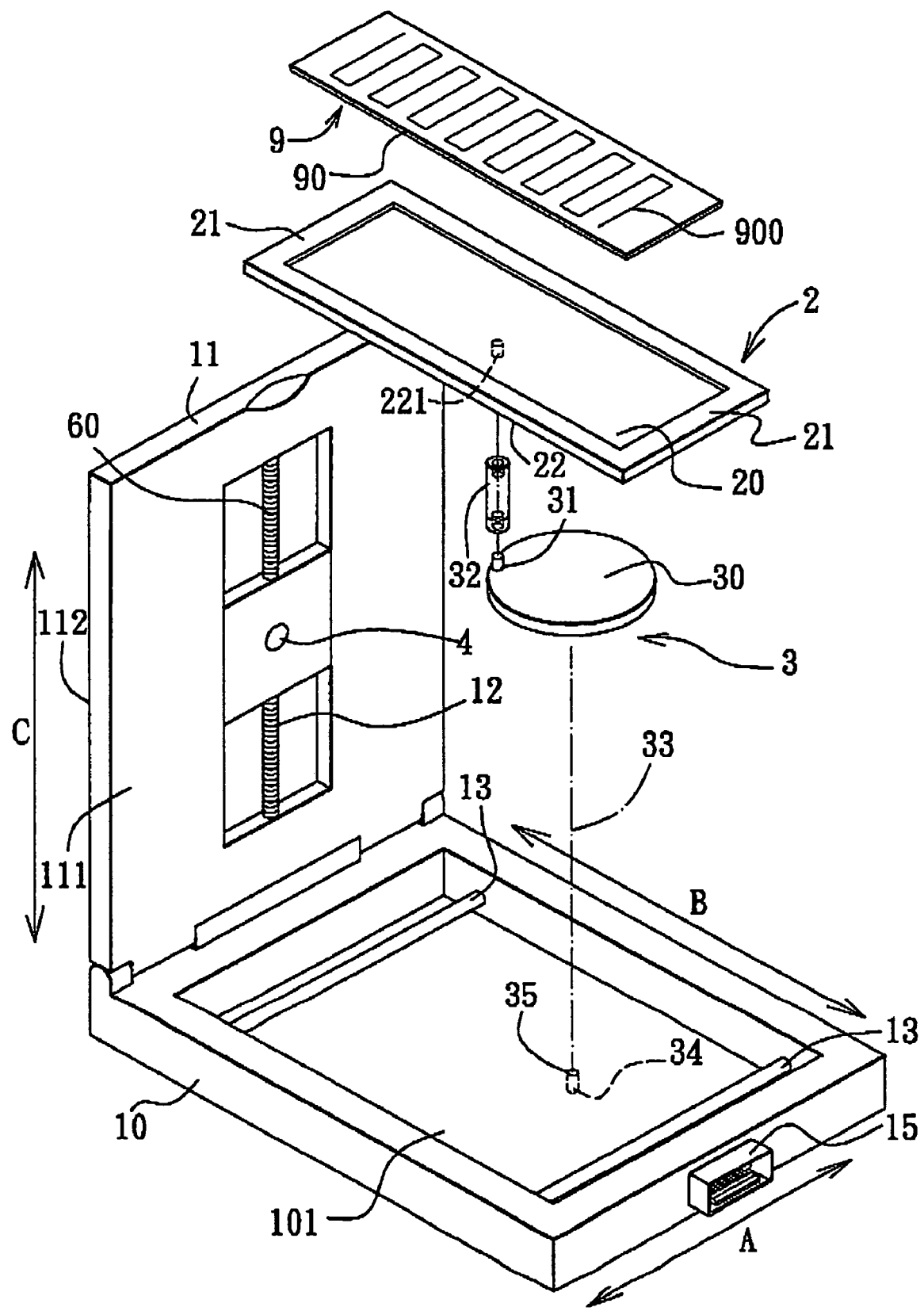
F I G. 2

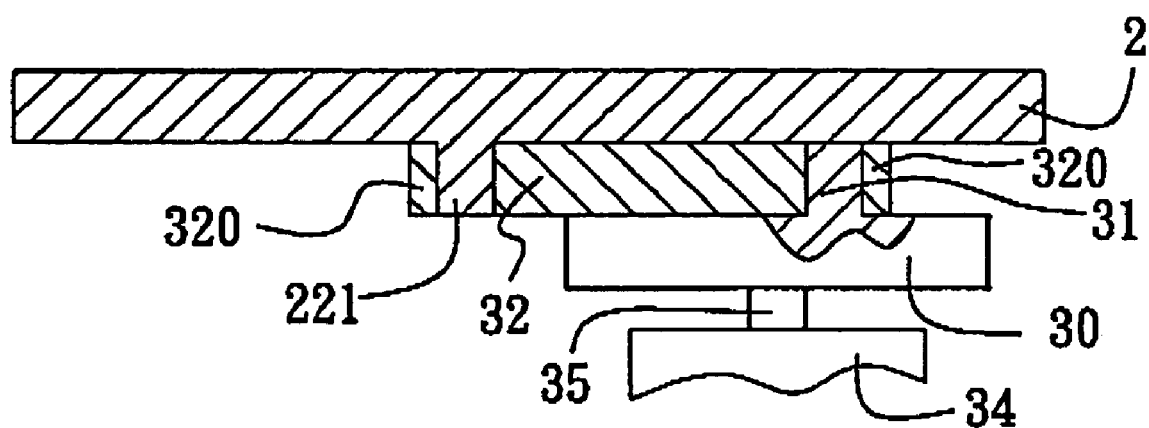
F I G. 4

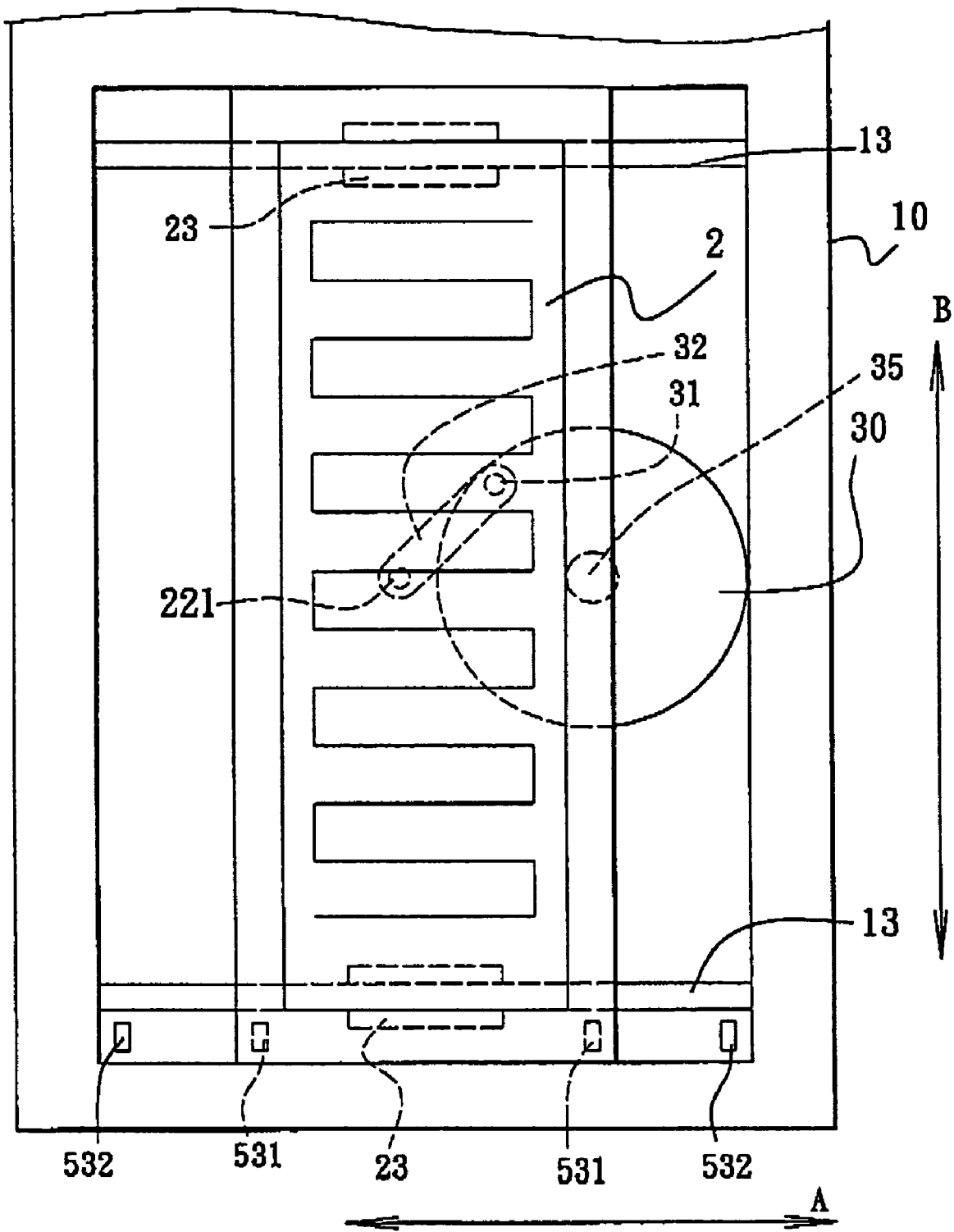
F I G. 5

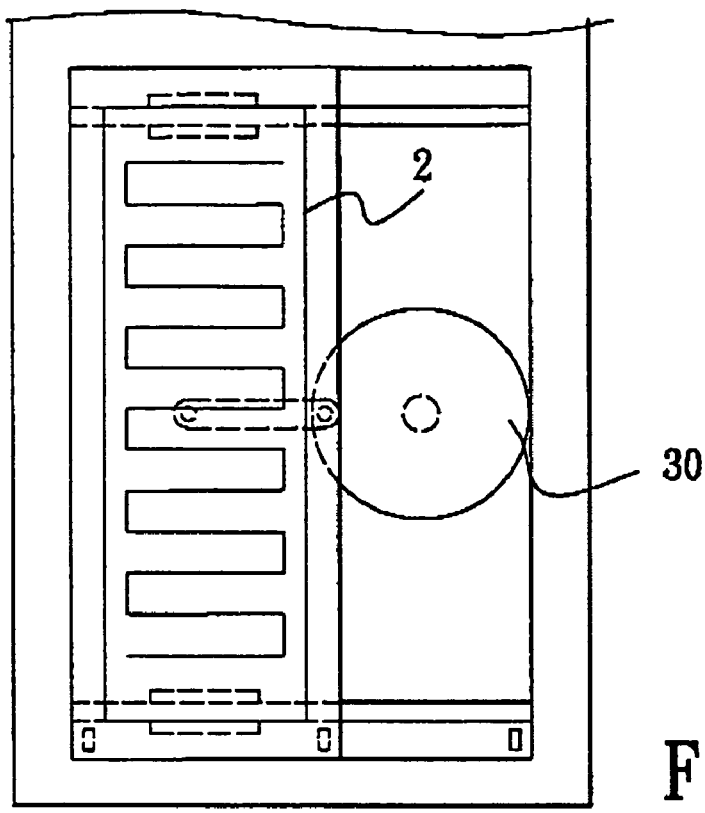
F I G. 6
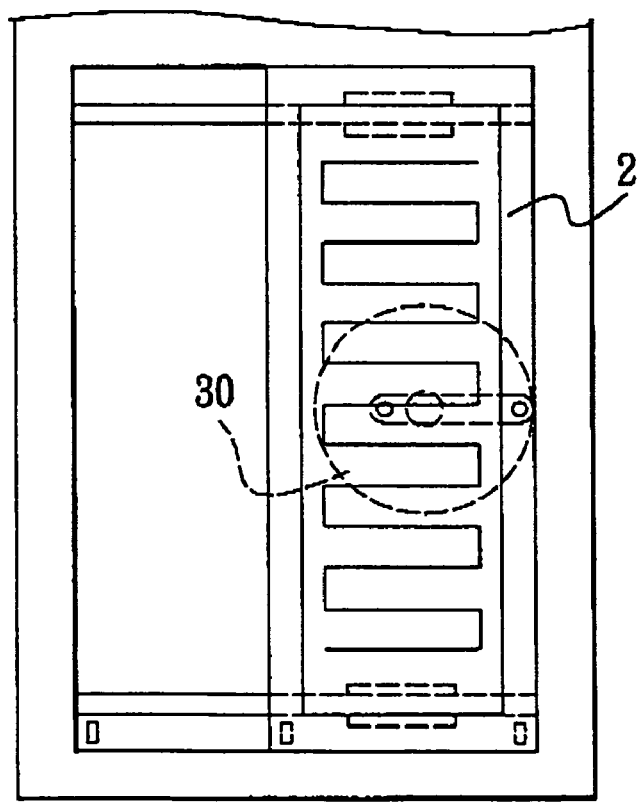
F I G. 7

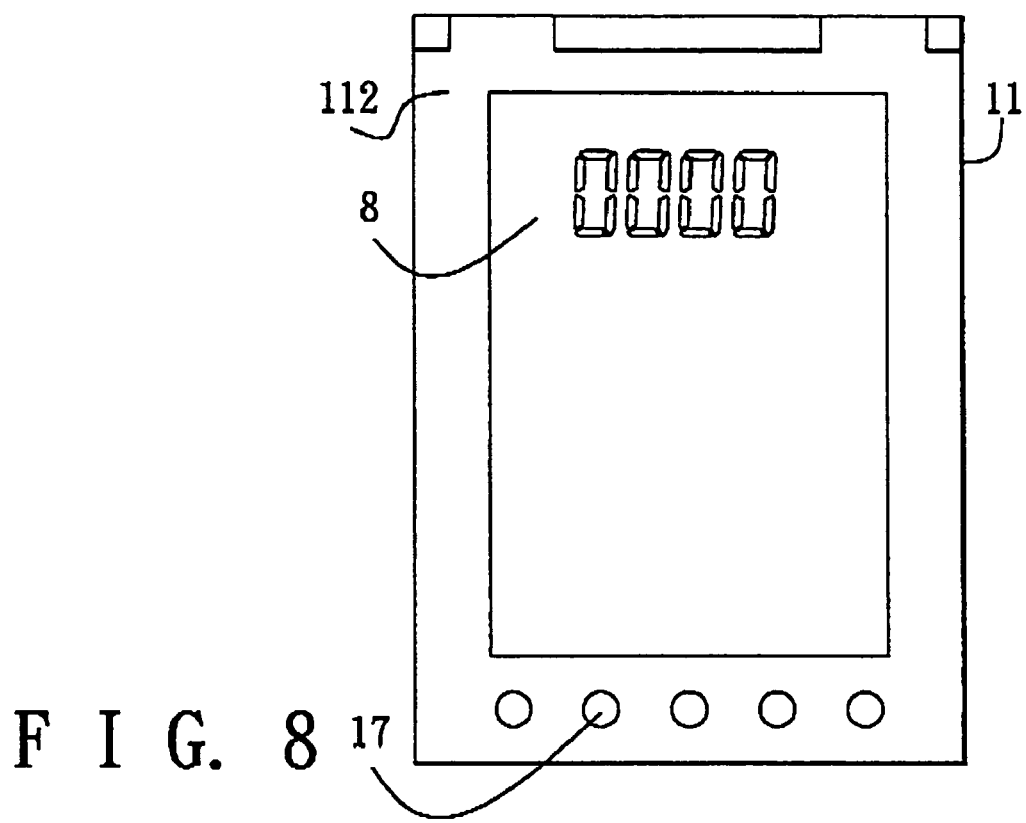
F I G. 8
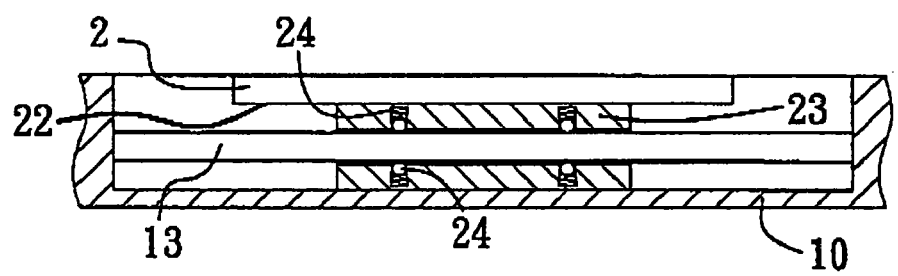
F I G. 9
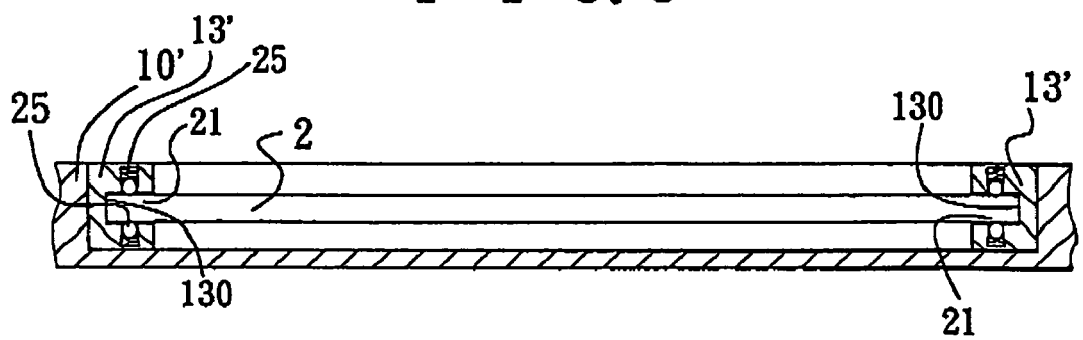
F I G. 10

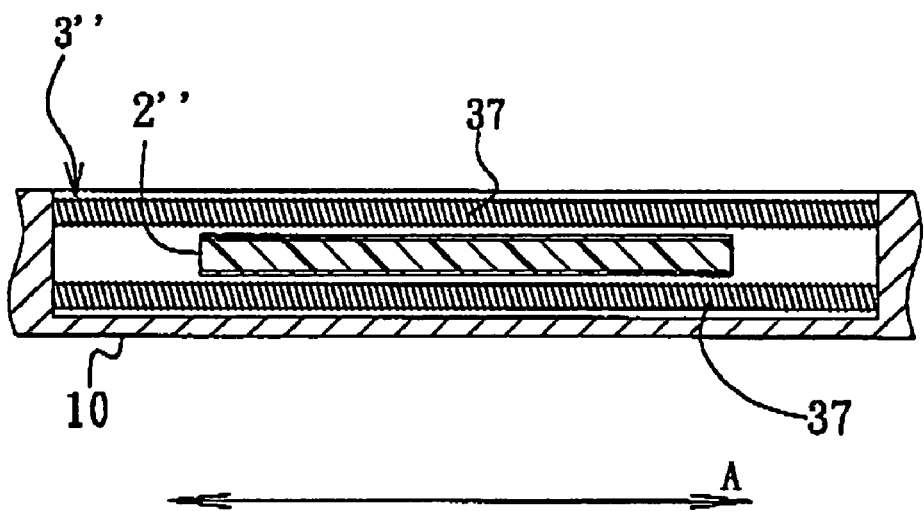
F I G. 13
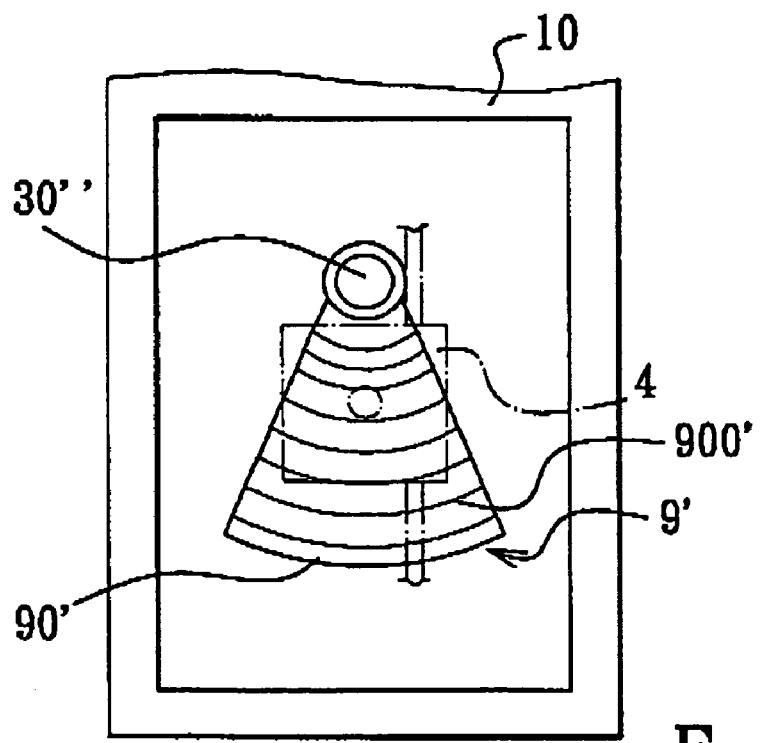
F I G. 14

APPARATUS FOR READING A DATA STORAGE MEDIUM

CROSS-REFERENCE TO RELATED APPLICATION

This application claims priority of Taiwanese Application No. 091219457, filed on Dec. 2, 2002.

BACKGROUND OF THE INVENTION

1. Field of the Invention

The invention relates to an apparatus for reading a data storage medium, more particularly to an apparatus for reading a data storage medium that is convenient to carry.

2. Description of the Related Art

Optical disks have been widely used as a data storage medium. However, a conventional apparatus for reading an optical disk, which has a diameter of 12 cm and a memory capacity of 650 M bytes, has a relatively large size, and is thus inconvenient to carry.

SUMMARY THE INVENTION

Therefore, the object of the present invention is to provide an apparatus for reading a data storage medium that is convenient to carry.

According to one aspect of the present invention, there is provided an apparatus for reading a data storage medium. The data storage medium includes a rectangular card body that has a surface formed with a data storage track having a plurality of parallel and equally spaced apart track sections that are stored with optically detectable information. The apparatus comprises:
  a housing;
  a carrier frame mounted movably in the housing and adapted to be loaded with the data storage medium thereon;
  a first driving unit mounted in the housing and associated operably with the carrier frame, the first driving unit being operable so as to drive the carrier frame to move back and forth between first and second limit positions along a first direction parallel to the track sections;
  an optical detecting unit mounted movably in the housing and adapted for reading the optically detectable information stored in one of the track sections when the carrier frame is moved by the first driving unit along the first direction;
  a second driving unit mounted in the housing and associated operably with the optical detector unit, the second driving unit being operable so as to drive the optical detecting unit to move along a second direction transverse to the first direction; and
  a control unit mounted in the housing and coupled electrically to the first and second driving units and the optical detecting unit, the control unit controlling the first driving unit so as to enable the first driving unit to drive the carrier frame to move back and forth between the first and second limit positions along the first direction, the control unit receiving the optically detectable information read by the optical detecting unit and activating the second driving unit to move the optical detecting unit by a predetermined distance along the second direction upon detection that the carrier frame has been moved by the first driving unit from one of the first and second limit positions to the other one of the first and second limit positions.

According to another aspect of the present invention, there is provided a data storage medium for storing optically detectable information. The data storage medium comprises:
  a sector card body having a surface that is formed with a data storage track having a plurality of equally spaced apart curved track sections that are adapted to be stored with the optically detectable information.

According to a further aspect of the present invention, there is provided an apparatus for reading a data storage medium. The data storage medium includes a sector card body having a surface that is formed with a data storage track having a plurality of equally spaced apart curved track sections that are stored with optically detectable information. The apparatus comprises:
  a housing;
  a pivot axle mounted rotatably in the housing and adapted to be sleeved with the data storage medium thereon such that the data storage medium is rotated together with the pivot axle;
  a first driving unit mounted in the housing and associated operably with the pivot axle, the first driving unit being operable so as to drive the pivot axle to rotate in clockwise and counterclockwise directions so as to drive the data storage medium to rotate back and forth between first and second limit positions;
  an optical detecting unit mounted movably in the housing and adapted for reading the optically detectable information stored in one of the curved track sections when the data storage medium is rotated by the first driving unit;
  a second driving unit mounted in the housing and associated operably with the optical detector unit, the second driving unit being operable so as to drive the optical detecting unit to move along a radial direction relative to the pivot axle; and
  a control unit mounted in the housing and coupled electrically to the first and second driving units and the optical detecting unit, the control unit controlling the first driving unit so as to enable the first driving unit to drive the data storage medium to rotate back and forth between the first and second limit positions, the control unit receiving the optically detectable information read by the optical detecting unit and activating the second driving unit to move the optical detecting unit by a predetermined distance along the radial direction upon detection that the data storage medium has been moved by the first driving unit from one of the first and second limit positions to the other one of the first and second limit positions.

BRIEF DESCRIPTION OF THE DRAWINGS

Other features and advantages of the present invention will become apparent in the following detailed description of the preferred embodiments with reference to the accompanying drawings, of which:

FIG. 2 is an exploded perspective view showing the first preferred embodiment;

FIG. 4 is a schematic sectional view showing the relationship between a first driving unit and a carrier frame in the first preferred embodiment;

FIGS. 5 to 7 are schematic top views illustrate movement of the carrier frame between first and second limit positions;

FIG. 8 is schematic view showing a display of the first preferred embodiment;

FIG. 9 is a schematic sectional view showing a guide unit of the first preferred embodiment;

FIG. 10 is a schematic sectional view showing a guide unit of the second preferred embodiment of an apparatus for reading a data storage medium according to the present invention;

FIG. 13 is a schematic view showing the relationship between a first driving unit and a carrier frame in the fifth preferred embodiment of an apparatus for reading a data storage medium according to the present invention; and FIG. 14 is a schematic view showing the sixth preferred embodiment of an apparatus for reading a data storage medium according to the present invention.

DETAILED DESCRIPTION OF THE PREFERRED EMBODIMENTS

Figure 1:
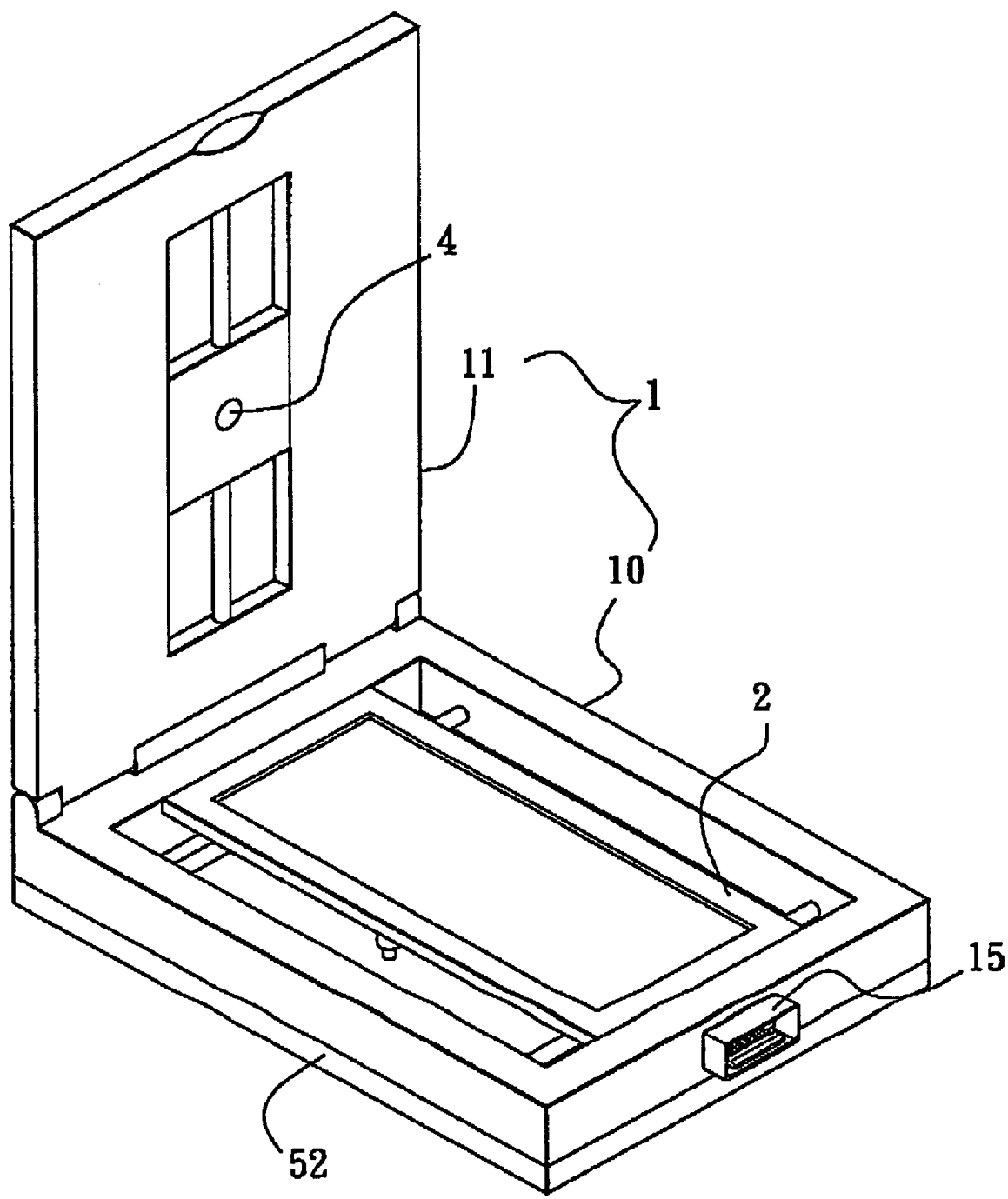
FIG. 1 is a perspective view showing the first preferred embodiment of an apparatus for reading a data storage medium according to the present invention.

Before the present invention is described in greater detail, it should be noted that like elements are denoted by the same reference numerals throughout the disclosure.

Figure 3:
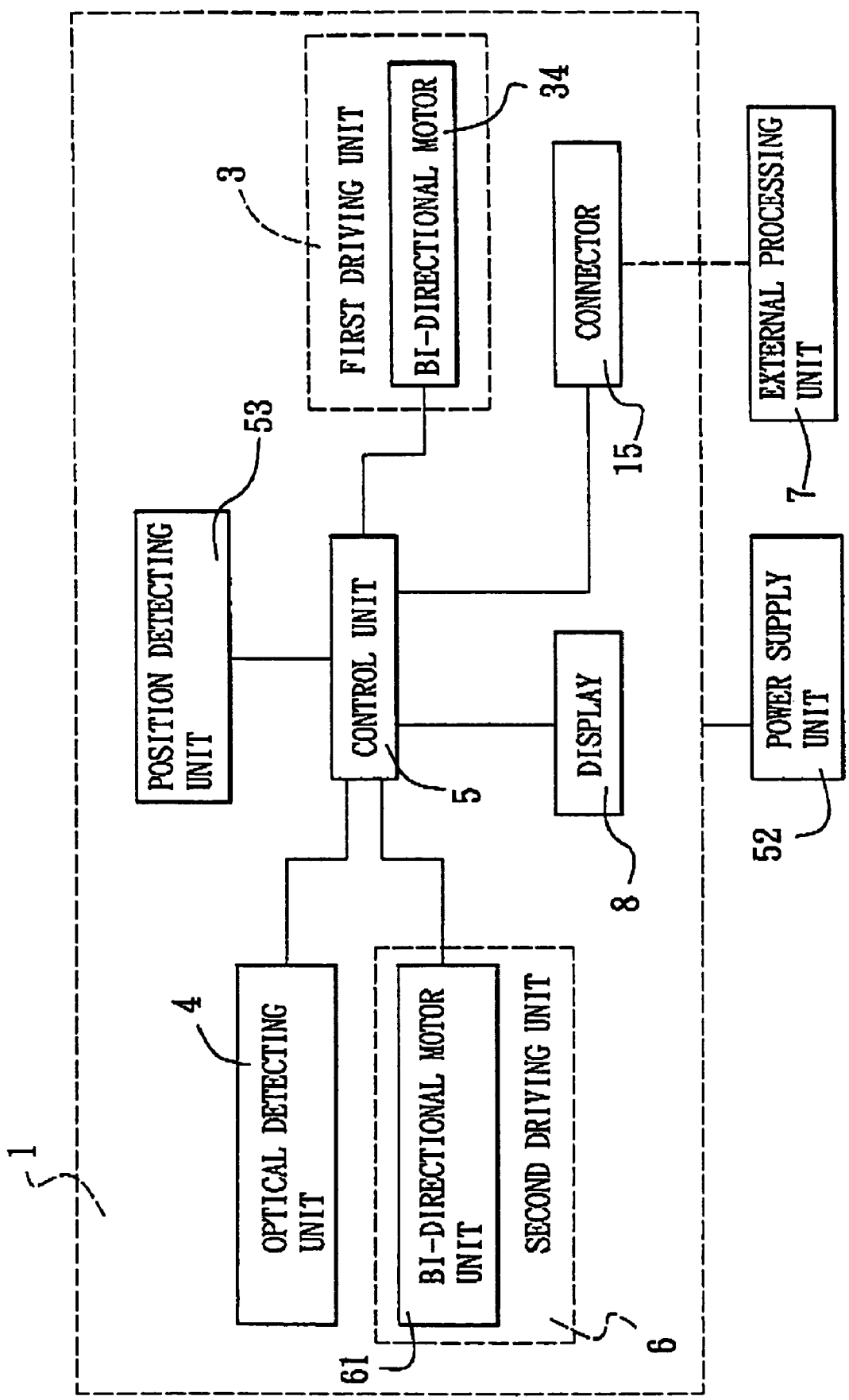
FIG. 3 is a schematic electrical circuit block diagram illustrating the first preferred embodiment.

Referring to FIGS. 1 to 3, the first preferred embodiment of an apparatus for reading a data storage medium 9 according to the present invention is shown. The data storage medium 9 includes a rectangular card body 90 that has a surface formed with a data storage track having a plurality of parallel and equally spaced apart track sections 900 which are stored with optically detectable information. The apparatus includes a housing 1, a carrier frame 2, a first driving unit 3, an optical detecting unit 4, a second driving unit 6, and a control unit 5 coupled electrically to the first and second driving units 3, 6 and the optical detecting unit 4.

The carrier frame 2 is mounted movably in the housing 1 and is adapted to be loaded with the data storage medium 9 therein. In this embodiment, the carrier frame 2 has opposite ends 21, and a bottom surface 22 formed with a pivot post 221 (see FIG. 2).

In this embodiment, the housing 1 includes a hollow base 10 and a cover 11. The base 10 houses the carrier frame 2, the first driving unit 3 and the control unit 5 therein, and has an open top end 101 such that the data storage medium 9 is adapted to be disposed on and taken away from the carrier frame 2 via the open top end 101. The cover 11 is connected pivotally to the base 10 and is operable so as to move between a closed position, where the cover 11 closes the open top end 101 of the base 10, and an opened position, where an angle is formed between the cover 11 and the base 10. The cover 11 has an inner surface 111 formed with a receiving groove 12 for receiving the optical detecting unit 4 and the second driving unit 6, and an outer surface 112 opposite to the inner surface 111.

The first driving unit 3 is mounted in the base 10 of the housing 1 and is associated operably with the carrier frame 2. The first driving unit 3 is operable so as to drive the carrier frame 2 to move back and forth between first and second limit positions along a first direction (A) parallel to the track sections 900. In this embodiment, the first driving unit 3 includes a bi-directional motor 34, a circular plate 30 and a connecting rod 32. The bi-directional motor 34 is mounted in the base 10 and is disposed below the carrier frame 2. The bi-directional motor 34 has a drive shaft 35 extending along an axis 33 that is transverse to the bottom surface 22 of the carrier frame 2. The plate 30 is mounted on the drive shaft 35 so as to rotate together therewith and is disposed below the carrier frame 2. The plate 30 is formed with a pivot post 31. The connecting rod 32 is disposed between the plate 30 and the carrier frame 2 and has opposite ends 320 that are coupled pivotally to the pivot posts 221, 31 of the carrier frame 2 and the plate 30, respectively, as shown in FIG. 4. The bi-directional motor 34 is connected to and is controlled by the control unit 5 such that rotation of the plate 30 in clockwise and counterclockwise directions results in back and forth movement of the carrier frame 2 between the first and second limit position along the first direction (A), as shown in FIGS. 5 to 7.

The optical detecting unit 4, such as a CMOS sensor array or a charge-coupled-device array, is mounted movably in the receiving groove 12 of the cover 11 and is adapted for reading the optically detectable information stored in one of the track sections 900 when the carrier frame 2 is moved by the first driving unit 3 along the first direction (A).

The second driving unit 6 is mounted in the cover 11 of the housing 1 and is associated operably with the optical detecting unit 4. The second driving unit 6 is operable so as to drive the optical detecting unit 4 to move along a second direction (B) transverse to the first direction (A). In this embodiment, the second driving unit 6 includes a bi-directional motor unit 61 disposed in the cover 11 and having a threaded guide shaft 60 that extends in the receiving groove 12 along a third direction (C) parallel to the inner surface 111 and transverse to the first direction (A). The optical detecting unit 4 is sleeved threadedly on the threaded guide shaft 60. The bi-directional motor unit 61 is connected to and is controlled by the control unit 5 so as to enable the threaded guide shaft 60 to drive the optical detecting unit 4 to move along the second direction (B) when the cover 11 is disposed in the closed position.

The control unit 5, which is mounted in the base 10 of the housing 1, controls the first driving unit 3 so as to enable the first driving unit 3 to drive the carrier frame 2 to move back and forth between the first and second limit positions along the first direction (A). The control unit 5 receives the optically detectable information read by the optical detecting unit 4 and activates the second driving unit 6 to move the optical detecting unit 4 by a predetermined distance along the second direction (B) upon detection that the carrier frame 2 has been moved by the first driving unit 3 from one of the first and second limit positions to the other one of the first and second limit positions. It is noted that the predetermined distance is equal to a distance between adjacent ones of the track sections 900 such that, when the second driving unit 6 is activated by the control unit 5, the optical detecting unit 4 is moved away from an initial one of the track sections 900 and is brought into alignment with another one of the track sections 900 adjacent to the initial one of the track sections 900.

With further reference to FIGS. 3 and 5, a position detecting unit 53, which is disposed in the base 10, is coupled electrically to the control unit 5 for detecting position of the carrier frame 2. The position detecting unit 53 generates a signal to the control unit 5 upon detection that the carrier frame 2 has been moved to one of the first and second limit positions. In this embodiment, the position detecting unit 53 includes a pair of light emitters 531 and a pair of light sensors 532. The light emitters 531 are mounted on the bottom surface 22 of the carrier frame 2 and are spaced apart from each other in the first direction (A). The light sensors 532 are mounted in the base 10 and are spaced apart from each other in the first direction (A). One of the light sensors 532, which is adjacent to the first limit position, senses light emitted by a corresponding one of the light emitters 531 so as to generate the signal to the control unit 5 when the carrier frame 2 is moved to the first limit position. One of the light sensors 532, which is adjacent to the second limit position, senses light emitted by a corresponding one of the light emitters 531 so as to generate the signal to the control unit 5 when the carrier frame 2 is moved to the second limit position.

The control unit 5 is adapted to process the optically detectable information from the optical detecting unit 4 and to provide the optically detectable information to an external processing unit 7. The apparatus further includes a connector 15 mounted on the base 10 of the housing 1, as shown in FIG. 2. The connector 15 is coupled electrically to the control unit 5 and is adapted to be coupled to the external processing unit 7 for transmitting the optically detectable information to the external processing unit 7. In this embodiment, the connector 15 can be a USB connector, a PCMCIA connector or an RS232 connector. Alternatively, the connector 15 may be replaced with a frequency signal generator (not shown) for wirelessly transmitting the optically detectable information to the external processing unit 7.

The apparatus further includes a power supply unit 52 mounted detachably on the base 10 of the housing 1 in any suitable manner for providing electric power to the apparatus, as shown in FIG. 1.

With further reference to FIG. 8, the apparatus further includes a display 8 mounted on the outer surface 112 of the cover 11 (see FIG. 8) and coupled electrically to the control unit 5 (see FIG. 1). The outer surface 112 of the cover 11 is provided with a plurality of function keys 17 for further operation.

With further reference to FIGS. 5 and 9, the apparatus further includes a guide unit that is disposed in the base 10 for guiding movement of the carrier frame 2 along the first direction (A). In this embodiment, the guide unit includes a pair of parallel guide rods 13 and a pair of mounting seats 23. The guide rods 13 extend along the first direction (A) and are spaced apart from each other in the second direction (B) (see FIG. 2). The carrier frame 2 is disposed on the guide rods 13. The mounting seats 23 are connected to the bottom surface 22 of the carrier frame 2 and are sleeved slidably and respectively on the guide rods 13 such that the carrier frame 2 is capable of sliding on the guide rods 13 along the first direction (A). In order to provide cushioning effect to the carrier frame 2, each of the mounting seats 23 is mounted with a plurality of spring-loaded rolling balls 24 that abut against the respective one of the guide rods 13, as shown in FIG. 9.

FIG. 10 illustrates a guide unit of the second preferred embodiment of an apparatus for reading a data storage medium according to this invention, which is a modification of the first preferred embodiment. Unlike the previous embodiment, the guide unit, which is disposed in the base 10, includes a pair of parallel guide blocks 13' extending along the first direction (A) and spaced apart from each other in the second direction (B) Each of the guide blocks 13' is formed with a guide groove 130 extending along the first direction (A). The opposite ends 21 of the carrier frame 2 are engaged slidably and respectively within the guide grooves 130 in the guide blocks 13' such that the carrier frame 2 is capable of sliding between the guide blocks 13' along the first direction (A). In order to provide cushioning to the carrier frame 2, each of the guide blocks 13' is mounted with a plurality of spring-loaded rolling balls 25 in the guide groove 130 that abut against the respective one of the ends 21 of the carrier frame 2.

Figure 11:
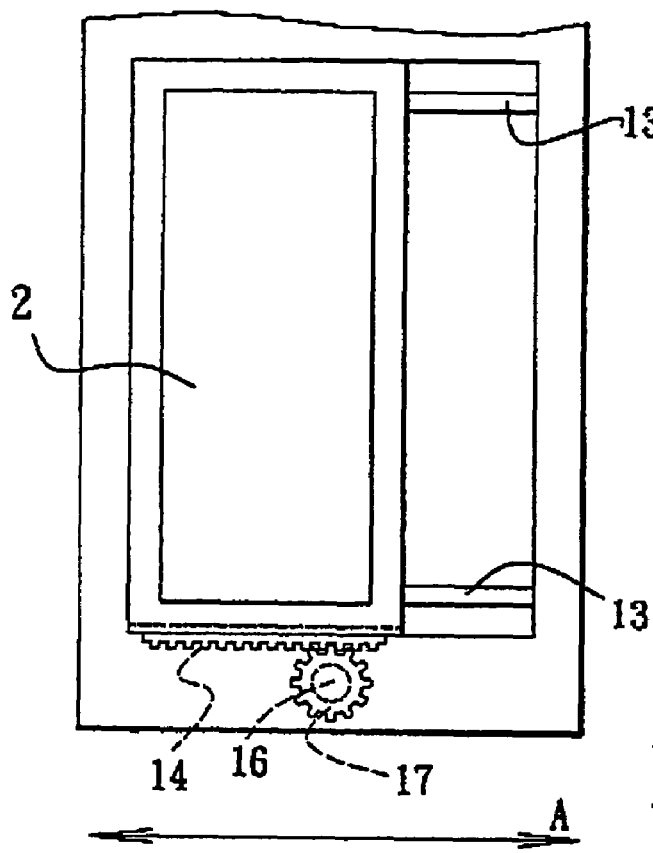
FIG. 11 is a schematic sectional view showing a first driving unit of the third preferred embodiment of an apparatus for reading a data storage medium according to the present invention.

FIG. 11 illustrates a first driving unit of the third preferred embodiment of an apparatus for reading a data storage medium according to this invention, which is a modification of the first preferred embodiment. In this embodiments, the first driving unit includes an elongated rack 14 and a gear 17. The rack 14 is mounted on one side of the carrier frame 2, which is parallel to the first direction (A). The gear 17 is driven to rotate by a bi-directional motor unit (not shown) under the control of the control unit about an axis 16 that is transverse to a plane formed by the guide rods 13, and meshes with the rack 34.

Figure 12:
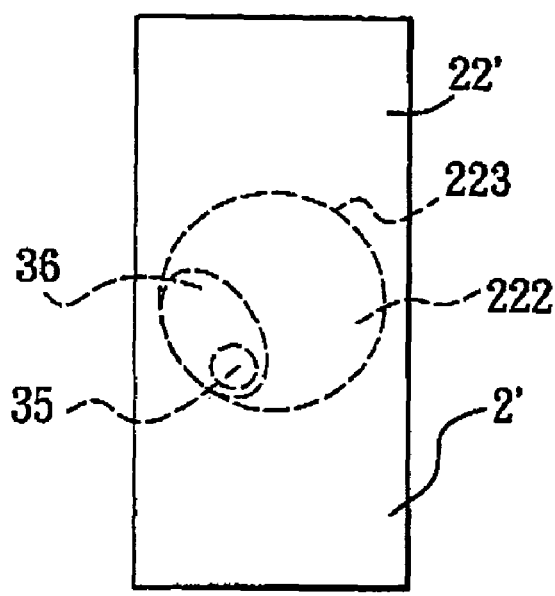
FIG. 12 is a schematic view showing the relationship between a first driving unit and a carrier frame in the to fourth preferred embodiment of an apparatus for reading a data storage medium according to the present invention.

FIG. 12 illustrates a first driving unit of the fourth preferred embodiment of an apparatus for reading a data storage medium according to this invention, which is a modification of the first preferred embodiment. Unlike the previous embodiments, the carrier frame 2' has a bottom surface 22' formed with a circular recess 222 that has an inner wall 223.

The first driving unit includes the aforesaid bi-directional motor 34 (not shown) and an eccentric wheel 36. The bi-directional motor 34 has a drive shaft 35 extending along an axis that is transverse to the bottom surface 22' of the carrier frame 2'. The eccentric wheel 36 is mounted on the drive shaft 35, is received in the recess 222, and abuts against the inner wall 223 of the recess 222. A largest distance between the drive shaft 35 and a periphery of the eccentric wheel 36 is longer than a radius of the circular recess 222. The bi-directional motor 34 is connected to and is controlled by the control unit such that rotation of the eccentric wheel 222 in clockwise and counterclockwise directions results in back and forth movement of the carrier frame 22' between the first and second limit positions.

FIG. 13 illustrates a first driving unit of the fifth preferred embodiment of an apparatus for reading a data storage medium according to this invention, which is a modification of the first preferred embodiment. Unlike the previous embodiments, the carrier frame 2" has opposite conductive surfaces and opposite sides in the second direction (B).

The first driving unit 3" includes two pairs of elongated electromagnets 37 (only one pair is shown) extending along the first direction (A). Each pair of the electromagnets 37 is disposed adjacent to a respective one of the sides of the carrier frame 2". The electromagnets 37 in each pair are spaced apart from each other and are disposed above and below the carrier frame 2". The electromagnets 37 are connected to and are controlled by the control unit 5 so as to generate positive and negative magnetic fields in the first direction (A) when excited such that the carrier frame 2" is capable of moving back and forth between the first and second limit positions along the first direction (A).

FIG. 14 illustrates the sixth preferred embodiment of an apparatus for reading a data storage medium 9' according to the present invention, which is a modification of the first preferred embodiment. Unlike the previous embodiments, the data storage medium 9' includes a sector card body 90' having a surface that is formed with a data storage track having a plurality of equally spaced apart curved track sections 900' which are stored with optically detectable information. In this embodiment, a pivot axle 30", such as the drive shaft of a bi-directional motor, is used instead of the carrier frame described in the previous embodiments. The pivot axle 30" is mounted rotatably in the base 10 and is adapted to be sleeved with the data storage medium 9' thereon such that the data storage medium 9' is rotated together with the pivot axle 30". The first driving unit is operable so as to drive the pivot axle 30" to rotate in clockwise and counterclockwise directions so as to drive the data storage medium 9' to rotate back and forth between the first and second limit positions.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An apparatus for reading a data storage medium, the data storage medium including a rectangular card body that has a surface formed with a data storage track having a plurality of parallel and equally spaced apart track sections that are stored with optically detectable information, said apparatus comprising:
   a housing;
   a carrier frame mounted movably in said housing and adapted to be loaded with the data storage medium thereon;
   a first driving unit mounted in said housing and associated operably with said carrier frame, said first driving unit being operable so as to drive said carrier frame to move back and forth between first and second limit positions along a first direction parallel to the track sections;
   an optical detecting unit mounted movably in said housing and adapted for reading the optically detectable information stored in one of the track sections when said carrier frame is moved by said first driving unit along the first direction;
   a second driving unit mounted in said housing and associated operably with said optical detector unit, said second driving unit being operable so as to drive said optical detecting unit to move along a second direction transverse to the first direction; and
   a control unit mounted in said housing and coupled electrically to said first and second driving units and said optical detecting unit, said control unit controlling said first driving unit so as to enable said first driving unit to drive said carrier frame to move back and forth between the first and second limit positions along the first direction, said control unit receiving the optically detectable information read by said optical detecting unit and activating said second driving unit to move said optical detecting unit by a predetermined distance along the second direction upon detection that said carrier frame has been moved by said first driving unit from one of the first and second limit positions to the other one of the first and second limit positions.

2. The apparatus as claimed in claim 1, wherein the predetermined distance is equal to a distance between adjacent ones of the track sections such that, when said second driving unit is activated by said control unit, said optical detecting unit is moved away from an initial one of the track sections and is brought into alignment with another one of the track sections adjacent to the initial one of the track sections.

3. The apparatus as claimed in claim 1, wherein said housing includes
   a hollow base for housing said carrier frame, said first driving unit and said control unit therein, said base having an open top end such that the data storage medium is adapted be disposed on and taken away from said carrier frame via said open top end, and
   a cover connected pivotally to said base and operable so as to move between a closed position, where said cover closes said open top end of said base, and an opened position, where an angle is formed between said cover and said base, said cover having an inner surface formed with a receiving groove for receiving said optical detecting unit and said second driving unit.

4. The apparatus as claimed in claim 3, further comprising a guide unit that is disposed in said base for guiding movement of said carrier frame along the first direction.

5. The apparatus as claimed in claim 4, wherein said guide unit includes
   a pair of parallel guide rods extending along the first direction and spaced apart from each other in the second direction, said carrier frame being disposed on said guide rods, and
   a pair of mounting seats connected to said carrier frame and sleeved slidably and respectively on said guide rods such that said carrier frame is capable of sliding on said guide rods along the first direction.

6. The apparatus as claimed in claim 5, wherein each of said mounting seats is mounted with a plurality of spring-loaded rolling balls that abut against the respective one of said guide rods.

7. The apparatus as claimed in claim 4, wherein said guide unit includes a pair of parallel guide blocks extending along the first direction and spaced apart from each other in the second direction, each of said guide blocks being formed with a guide groove extending along the first direction, said carrier frame having opposite ends engaged slidably and respectively within said guide grooves in said guide blocks such that said carrier frame is capable of sliding between said guide blocks along the first direction.

8. The apparatus as claimed in claim 7, wherein each of said guide blocks is mounted with a plurality of spring-loaded rolling balls in said guide groove that abut against the respective one of said ends of said carrier frame.

9. The apparatus as claimed in claim 3, wherein said first driving unit includes
   an elongated rack mounted on one side of said carrier frame, which is parallel to the first direction, and
   a gear meshing with said rack.

10. The apparatus as claimed in claim 3, wherein said carrier frame has a bottom surface formed with a pivot post, and said first driving unit includes:
    a bi-directional motor mounted in said base and disposed below said carrier frame, said bi-directional motor having a drive shaft extending along an axis that is transverse to said bottom surface of said carrier frame;
    a circular plate mounted on said drive shaft so as to rotate together therewith and disposed below said carrier frame, said plate being formed with a pivot post; and
    a connecting rod disposed between said plate and said carrier frame and having opposite ends that are coupled pivotally to said pivot posts of said carrier frame and said plate, respectievly;
    said bi-directional motor being connected to and being controlled by said control unit such that rotation of said plate in clockwise and counterclockwise directions results in back and forth movement of said carrier frame between the first and second limit positions along the first direction.

11. The apparatus as claimed in claim 3, wherein said carrier frame has a bottom surface formed with a circular recess that has an inner wall, and said first driving unit includes:
   a bi-directional motor mounted in said base and disposed below said carrier frame, said bi-directional motor having a drive shaft extending along an axis that is transverse to said bottom surface of said carrier frame; and
   an eccentric wheel mounted on said drive shaft, said eccentric wheel being received in said recess and abutting against said inner wall of said recess, a largest distance between said drive shaft and a periphery of said eccentric wheel being longer than a radius of said circular recess;
   said bi-directional motor being connected to and being controlled by said control unit such that rotation of said eccentric wheel in clockwise and counterclockwise directions results in back and forth movement of said carrier frame between the first and second limit positions along the first direction.

12. The apparatus as claimed in claim 3, wherein said carrier frame has opposite conductive surfaces and opposite sides in the second direction, said first driving unit including:
   two pairs of elongated electromagnets extending along the first direction, each pair of which is disposed adjacent to a respective one of said sides of said carrier frame, said electromagnets in each pair being spaced apart from each other and being disposed above and below said carrier frame;
   said electromagnets being connected to and being controlled by said control unit so as to generate positive and negative magnetic fields in the first direction when excited such that said carrier frame is capable of moving back and forth between the first and second limit positions along the first direction.

13. The apparatus as claimed in claim 3, wherein said second driving unit includes
   a bi-directional motor unit disposed in said cover and having a threaded guide shaft that extends in said receiving groove along a third direction parallel to said inner surface and transverse to the first direction, said optical detecting unit being sleeved threadedly on said threaded guide shaft,
   said bi-directional motor unit being connected to and being controlled by said control unit so as to enable said threaded guide shaft to drive said optical detecting unit to move along the second direction when said cover is disposed in the closed position.

14. The apparatus as claimed in claim 1, wherein said control unit is adapted to process the optically detectable information from said optical detecting unit and to provide the optically detectable information to an external processing unit.

15. The apparatus as claimed in claim 14, further comprising a connector mounted on said housing, said connector being coupled electrically to said control unit and being adapted to be coupled electrically to the external processing unit for transmitting the optically detectable information to the external processing unit.

16. The apparatus as claimed in claim 15, wherein said connector is one of a USB connector, a PCMCIA connector and an RS232 connector.

17. The apparatus as claimed in claim 14, further comprising a frequency signal generator mounted on said housing and coupled electrically to said control unit for wirelessly transmitting the optically detectable information to the external processing unit.

18. The apparatus as claimed in claim 1, further comprising a power supply unit mounted detachably on said housing for providing electric power to said apparatus.

19. The apparatus as claimed in claim 1, further comprising a display mounted on said housing and coupled electrically to said control unit.

20. The apparatus as claimed in claim 3, further comprising a position detecting unit disposed in said base and coupled electrically to said control unit for detecting position of said carrier frame, said position detecting unit generating a signal to said control unit upon detection that said carrier frame has been moved to one of the first and second limit positions.

21. The apparatus as claimed in claim 20, wherein said position detecting unit includes
   a pair of light emitters mounted on a bottom surface of said carrier frame and spaced apart from each other in the first direction, and
   a pair of light sensors mounted in said base and spaced apart from each other in the first direction,
   one of said light sensors, which is adjacent to the first limit position, sensing light emitted by a corresponding one of said light emitters so as to generate the signal to said control unit when said carrier frame is moved to the first limit position,
   one of said light sensors, which is adjacent to the second limit position, sensing light emitted by a corresponding one of said light emitters so as to generate the signal to said control unit when said carrier frame is moved to the second limit position.

22. An apparatus for reading a data storage medium, the data storage medium including a sector card body having a surface that is formed with a data storage track having a plurality of equally spaced apart curved track sections that are stored with optically detectable information, said apparatus comprising:
   a housing;
   a pivot axle mounted rotatably in said housing and adapted to be sleeved with the data storage medium thereon such that the data storage medium is rotated together with said pivot axle;
   a first driving unit mounted in said housing and associated operably with said pivot axle, said first driving unit being operable so as to drive said pivot axle to rotate in clockwise and counterclockwise directions so as to drive the data storage medium to rotate back and forth between first and second limit positions;
   an optical detecting unit mounted movably in said housing and adapted for reading the optically detectable information stored in one of the curved track sections when the data storage medium is rotated by said first driving unit;
   a second driving unit mounted in said housing and associated operably with said optical detector unit, said second driving unit being operable so as to drive said optical detecting unit to move along a radial direction relative to said pivot axle; and
   a control unit mounted in said housing and coupled electrically to said first and second driving units and said optical detecting unit, said control unit controlling said first driving unit so as to enable said first driving unit to drive the data storage medium to rotate back and forth between the first and second limit positions, said control unit receiving the optically detectable information read by said optical detecting unit and activating said second driving unit to move said optical detecting unit by a predetermined distance along the radial direction upon detection that the data storage medium has been moved by said first driving unit from one of the first and second limit positions to the other one of the first and second limit positions.

23. The apparatus as claimed in claim 22, wherein the predetermined distance is equal to a distance between adjacent ones of the curved track sections such that, when said second driving unit is activated by said control unit, said optical detecting unit is moved away from an initial one of the curved track sections and is brought into alignment with another one of the curved track sections adjacent to the initial one of the curved track sections.

24. The apparatus as claimed in claim 22, wherein said housing includes
   a hollow base for housing said pivot axle, said first driving unit and said control unit therein, said base having an open top end such that the data storage medium is adapted be sleeved on and taken away from said pivot axle via said open top end, and
   a cover connected pivotally to said base and operable so as to move between a closed position, where said cover closes said open top end of said base, and an opened position, where an angle is formed between said cover and said base, said cover having an inner surface formed with a receiving groove for receiving said optical detecting unit and said second driving unit.

25. The apparatus as claimed in claim 24, wherein said first driving unit is a bi-directional motor mounted in said base and having a drive shaft that serves as said pivot axle.

26. The apparatus as claimed in claim 24, wherein said second driving unit includes
   a bi-directional motor unit disposed in said cover and having a threaded guide shaft that extends in said receiving groove along a direction parallel to said inner surface, said optical detecting unit being sleeved threadedly on said threaded guide shaft,
   said bi-directional motor unit being connected to and being controlled by said control unit so as to enable said threaded guide shaft to drive said optical detecting unit to move along the radial direction when said cover is disposed in the closed position.

27. The apparatus as claimed in claim 22, wherein said control unit is adapted to process the optically detectable information from said optical detecting unit and to provide the optically detectable information to an external processing unit.

28. The apparatus as claimed in claim 27, further comprising a connector mounted on said housing, said connector being coupled electrically to said control unit and being adapted to be coupled electrically to the external processing unit for transmitting the optically detectable information to the external processing unit.

29. The apparatus as claimed in claim 28, wherein said connector is one of a USB connector, a PCMCIA connector and an RS232 connector.

30. The apparatus as claimed in claim 27, further comprising a frequency signal generator mounted on said housing and coupled electrically to said control unit for wirelessly transmitting the optically detectable information to the external processing unit.

31. The apparatus as claimed in claim 22, further comprising a power supply unit mounted detachably on said housing for providing electric power to said apparatus.

32. The apparatus as claimed in claim 22, further comprising a display mounted on said housing and coupled electrically to said control unit.

* * * * *